Oct. 7, 1958

F. J. KENNEDY 2,854,939

APPARATUS FOR MAKING ELECTRICAL OUTLET
BOXES WITH AUTOMATIC OPERATION

Filed Oct. 1, 1953

INVENTOR.
Frank J. Kennedy
BY Emery Varney
Whittemore & Dix
ATTORNEYS

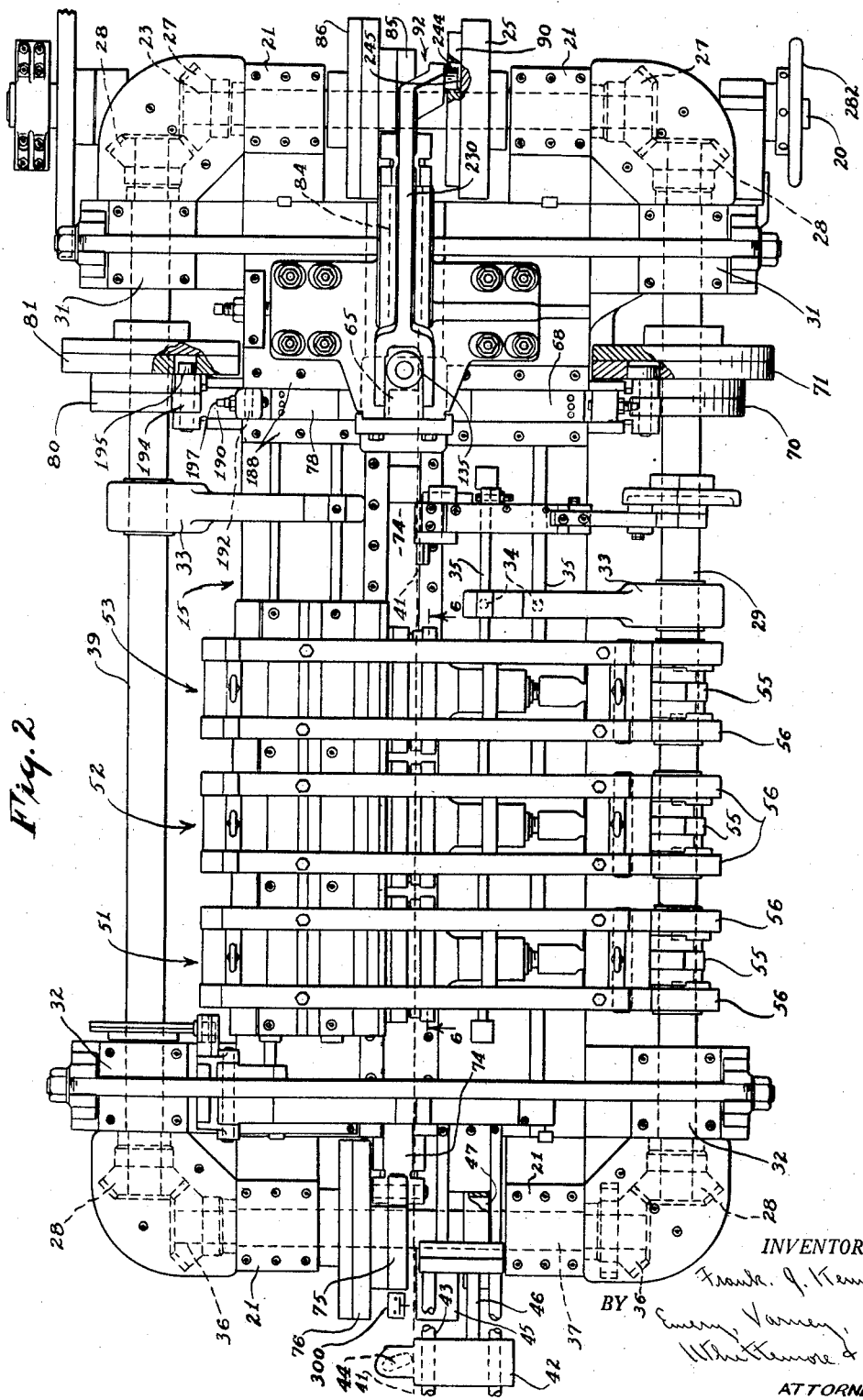

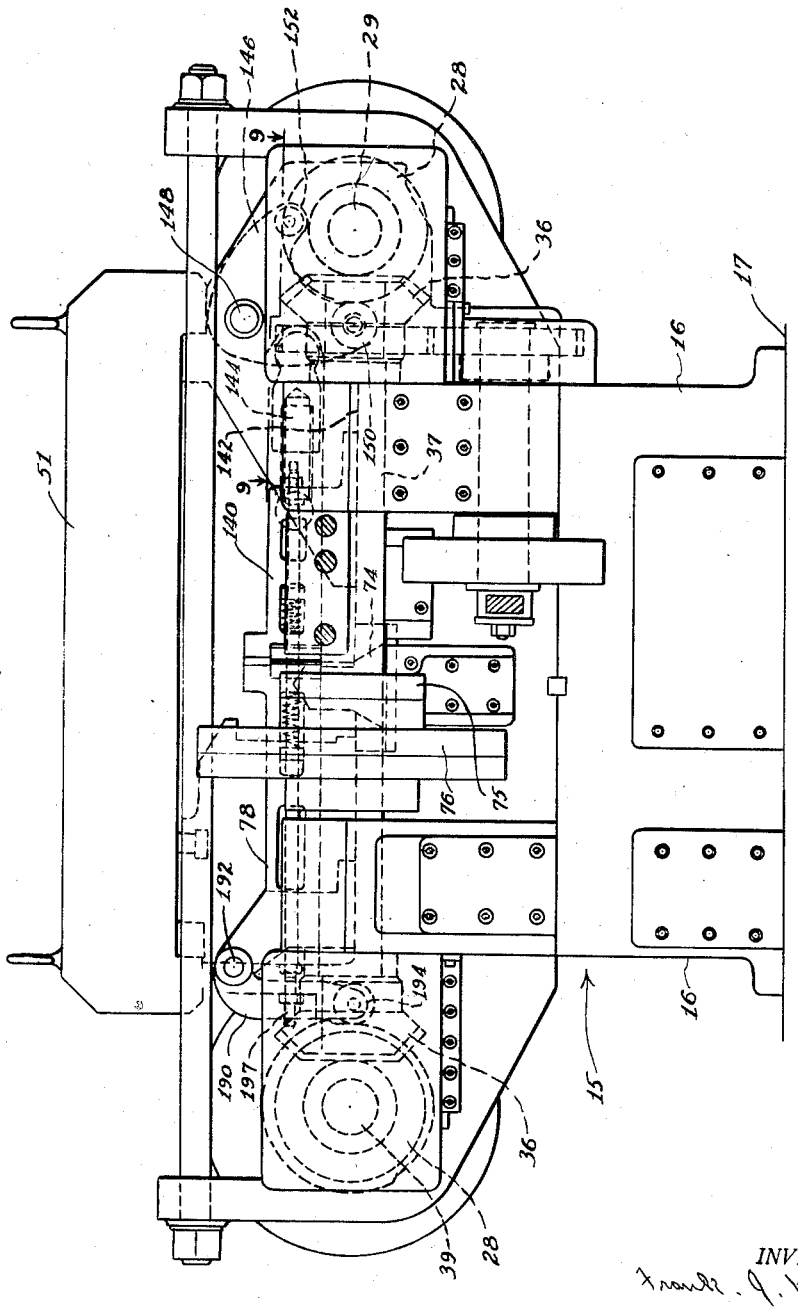

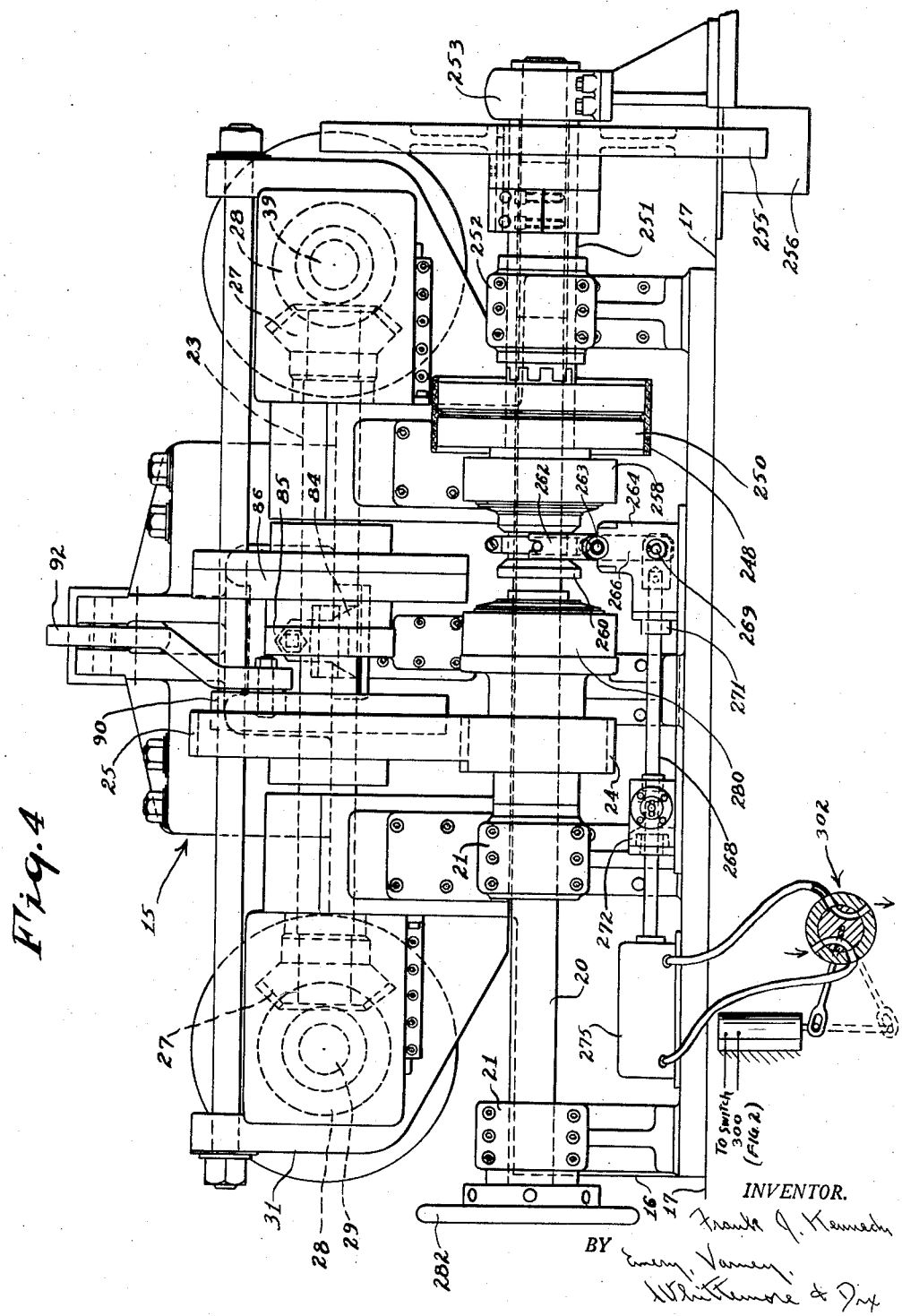

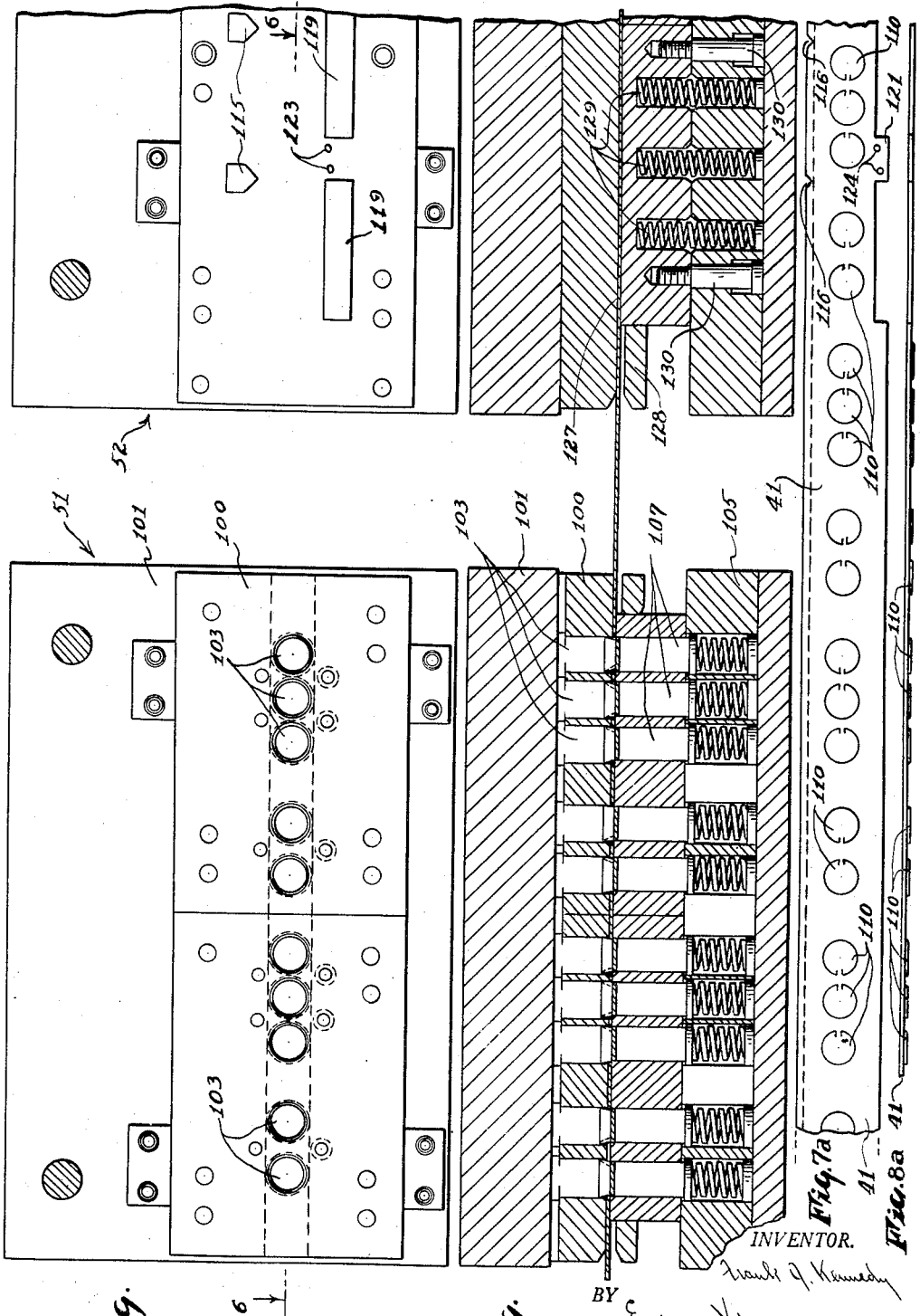

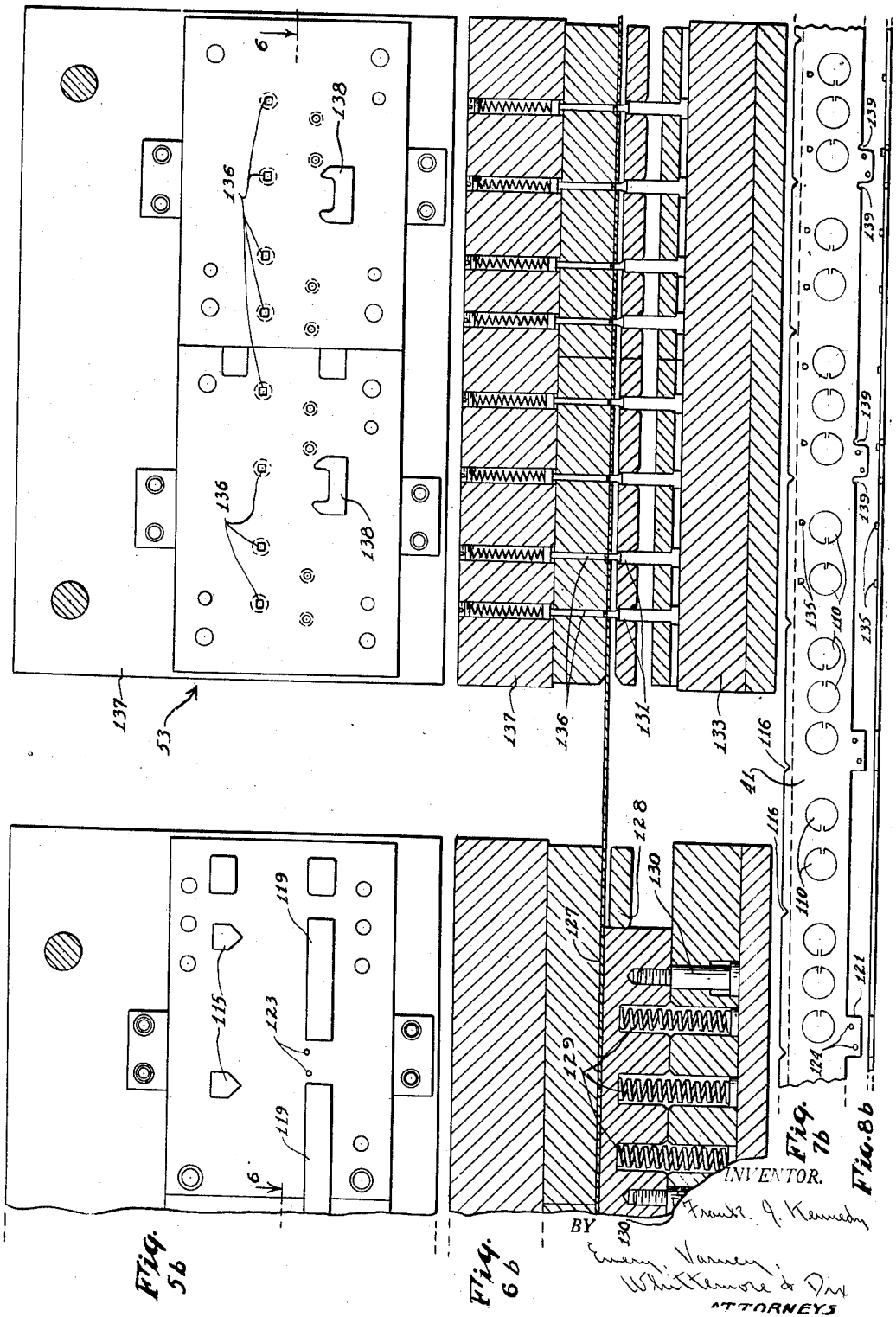

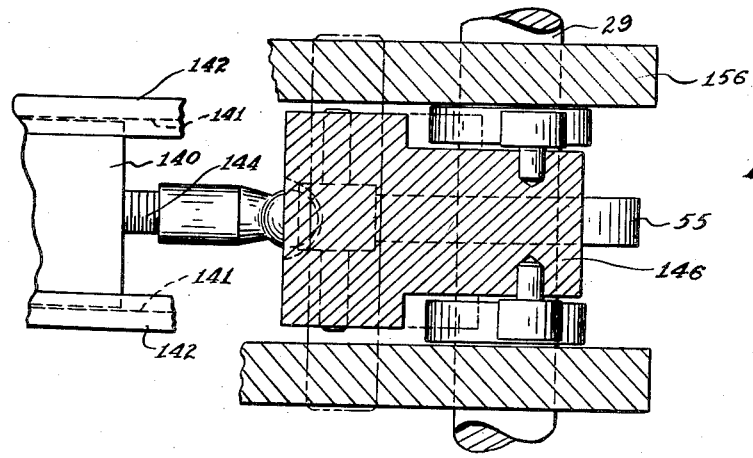
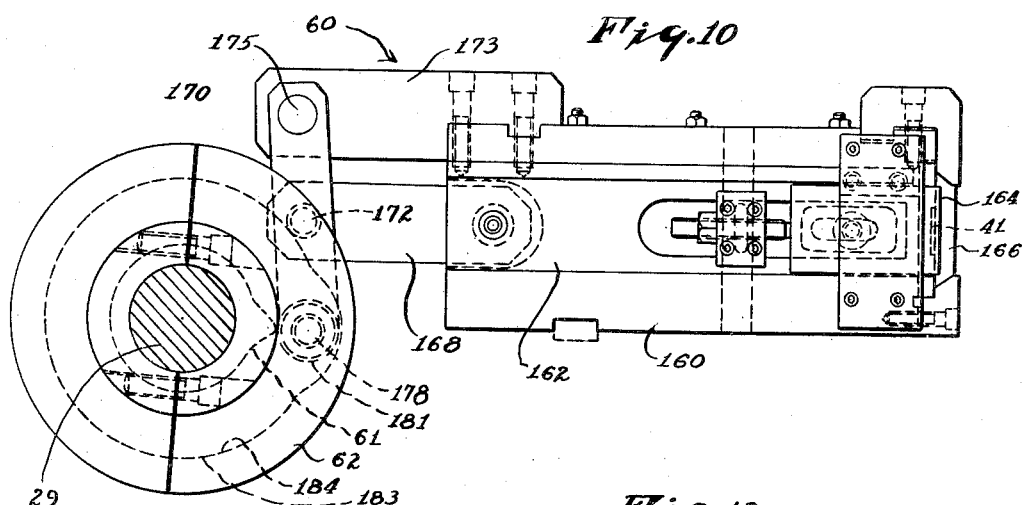
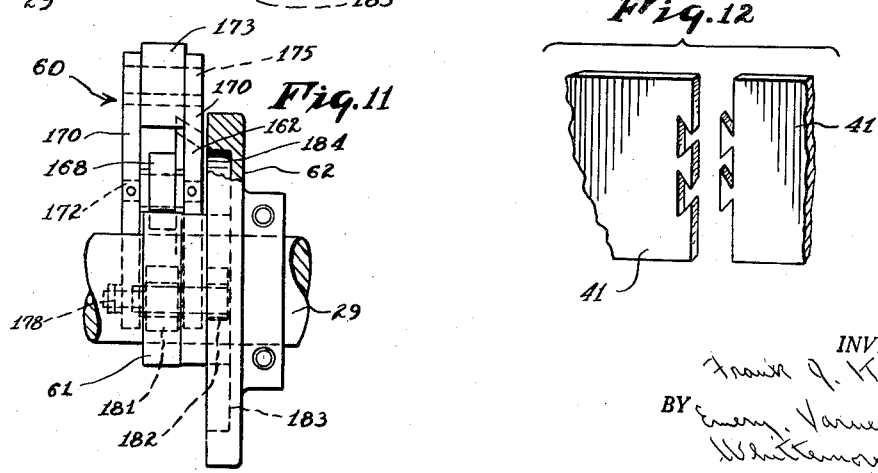

Oct. 7, 1958
F. J. KENNEDY
2,854,939
APPARATUS FOR MAKING ELECTRICAL OUTLET
BOXES WITH AUTOMATIC OPERATION
Filed Oct. 1, 1953
9 Sheets-Sheet 8
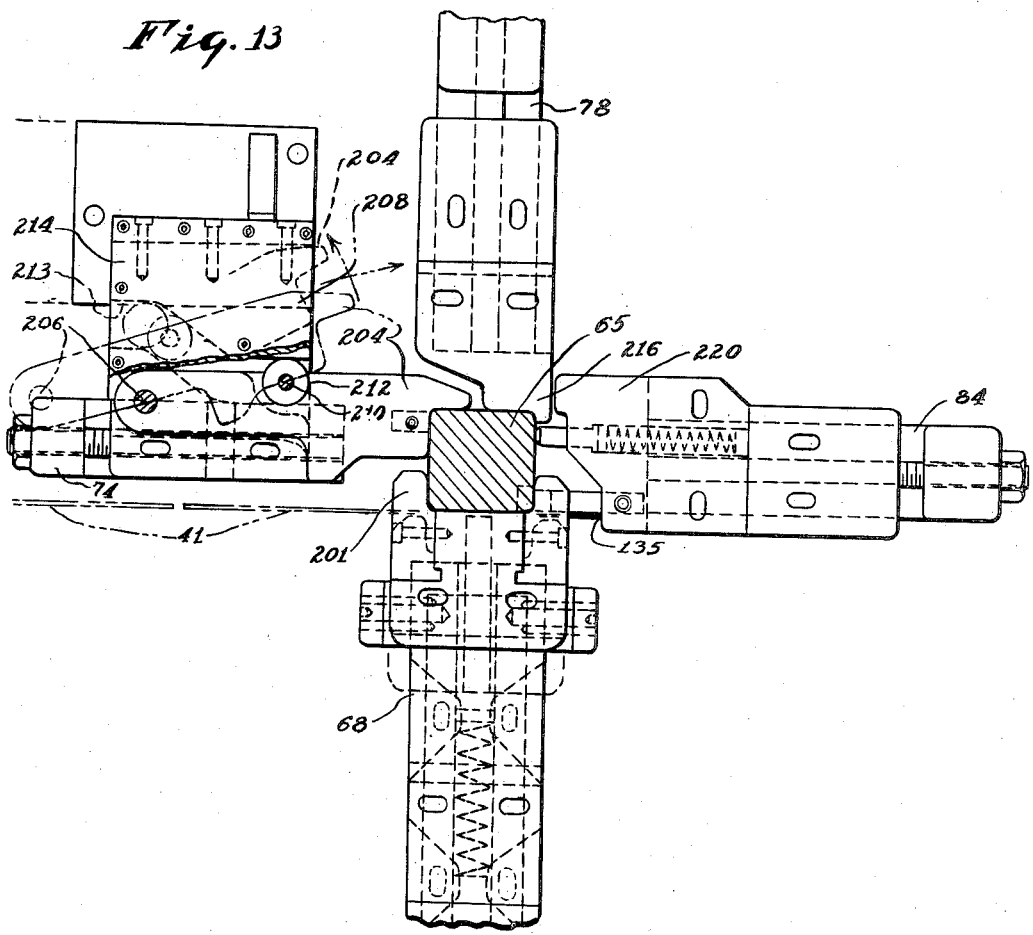
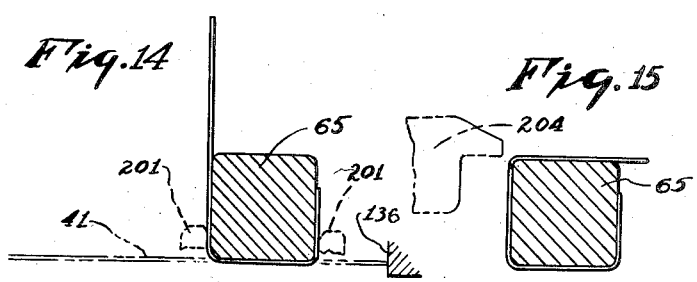
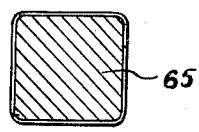
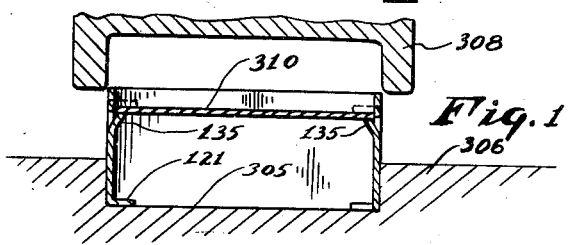
INVENTOR.
Frank J. Kennedy
BY
ATTORNEYS

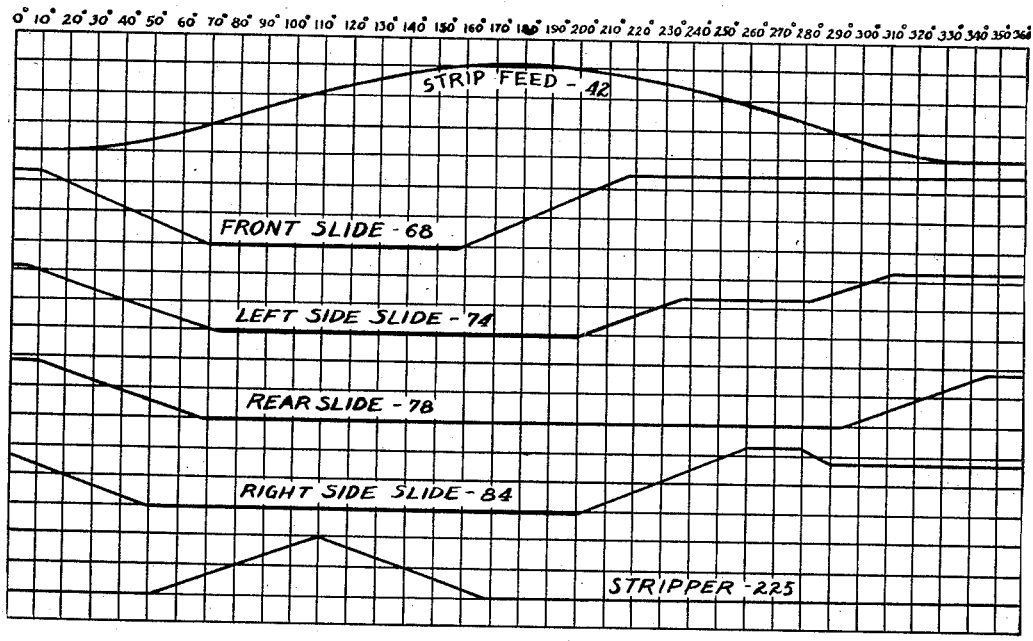
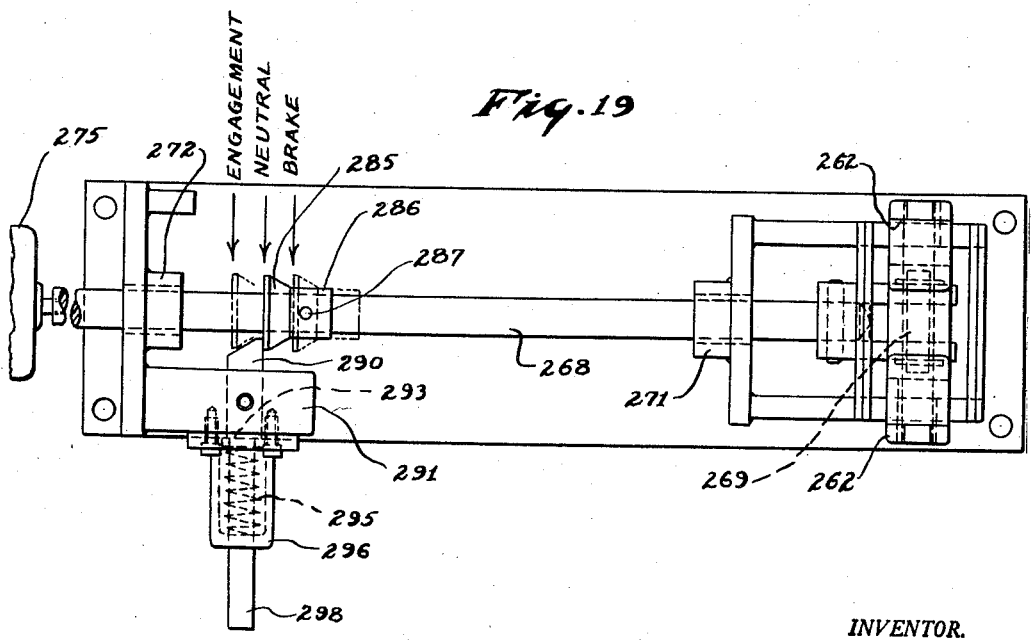

United States Patent Office 2,854,939
Patented Oct. 7, 1958

2,854,939

APPARATUS FOR MAKING ELECTRICAL OUTLET BOXES WITH AUTOMATIC OPERATION

Frank J. Kennedy, Mount Lebanon, Pa., assignor to National Electric Products Corporation, Pittsburgh, Pa., a corporation of Delaware Application October 1, 1953, Serial No. 383,566

5 Claims. (Cl. 113—1)

This invention relates to methods and apparatus for manufacturing electrical junction and outlet boxes, or the like. These boxes are larger than switch boxes and have different correlations of parts; and because of these differences cannot be made on the automatic machines which have been used for making the switch boxes.

It is an object of this invention to provide an improved automatic machine for making electrical outlet boxes, and more particularly the larger size electric outlet boxes which are substantially square. Such boxes are of standardized style and size. They have a back wall with openings for receiving nails, or other fastening means, for connnecting the boxes to the framing of a wall or other location at which the boxes are mounted. They also have inwardly extending lugs for connecting a cover over the front of the box. The automatic equipment of this invention produces boxes which meet the standard specifications.

One feature of the invention relates to the driving mechanism by which the apparatus can be started and stopped quickly so that the drive responds to automatic controls such as the limit switches that are used on automatic machines to stop them in the event of failure of the strip feed, or the breaking of a work strip in the machine.

Other features of the invention relate to the clutch and brake operation; to the cam operating mechanism for the different tools, and to the correlation of the forming tool operations that bend the sides of the box around a tool post.

Other objects, features and advantages of the invention will appear or be pointed out as the description proceeds.

In the drawing, forming a part hereof, in which like reference characters indicate corresponding parts in all the views:

Figure 2 is a top plan view of the multi-slide machine shown in Figure 1;

Figures 3 and 4 are enlarged views, of the left and right ends, respectively, of the machine shown in Figures 1 and 2;

Figures 5a and 5b are greatly enlarged views taken on the line 5—5 of Figure 1;

Figure 1:
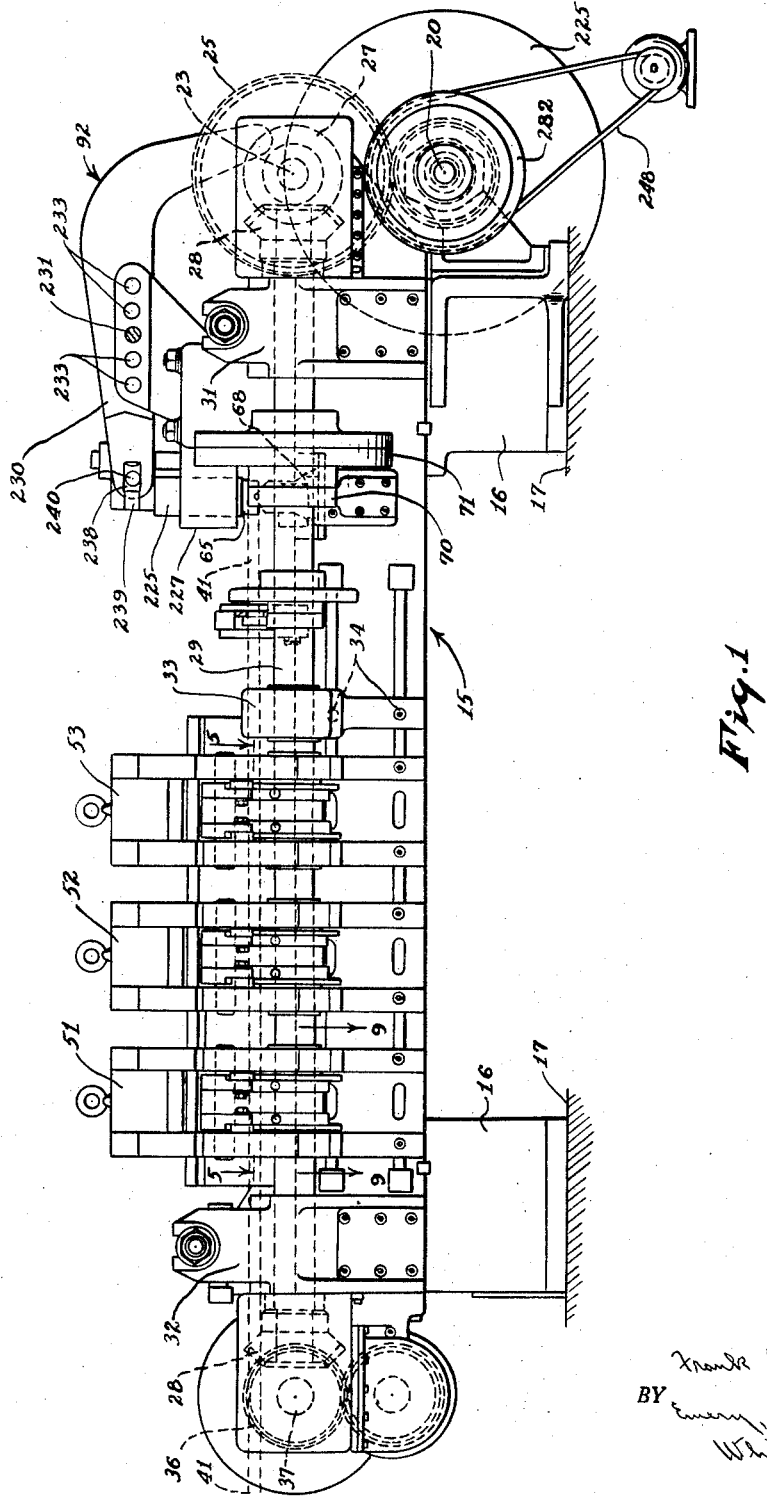
Figure 1 is a front elevation of a multi-slide machine embodying this invention.

Figures 6a and 6b are sectional views taken on the line 6—6 of Figure 2 and Figures 5a and 5b;

Figures 7a and 7b are front elevations, on a reduced scale, of the work strip as it advances through the die heads;

Figures 8a and 8b are top plan views of the work strip shown in Figures 7a and 7b, respectively;

Figure 9 is an enlarged, fragmentary, sectional view taken on the line 9—9 of Figure 1;

Figure 10 is an enlarged side view of the strip cut-off mechanism;

Figure 11 is a front view, partly broken away and in section, of the cut-off mechanism shown in Figure 10;

Figure 12 is a greatly enlarged view showing the cut made by the cut-off mechanism of Figures 10 and 11;

Figure 13 is an enlarged plan view of the forming tools around the tool post, which is shown in section;

Figures 14–16 are diagrammatic plan views showing the way in which the blank, cut from the strip, is progressively formed around the tool post;

Figure 17 is a diagrammatic, vertical, sectional view showing the final forming step performed on the box blank after it has been taken from the machine shown in the other views;

Figure 18 is a displacement diagram for the cams that operate the machine; and

Figure 19 is a greatly enlarged plan view of the latch structure of the clutch and brake operating mechanism shown in Figure 4.

The multislide machine of this invention includes a main frame 15 with legs 16 that support the machine from stationary foundations 17.

There is a drive shaft 20 at the right-hand end of the machine supported by bearings 21 which extend outwardly from the main frame 15. The drive shaft 20 is operated by an electric motor through driving connections that will be described in connection with Figure 4. The machine has a cam shaft 23, extending parallel to the main drive shaft 20, and the shaft 23 is driven from the drive shaft 20 through gears 24 and 25 secured to the shafts 20 and 23, respectively.

At the front end of the cam shaft 23, there is a bevel gear 27 which meshes with a similar bevel gear 28 secured to the right-hand end of a cam shaft 29.

The cam shaft 29 extends throughout the length of the machine, through bearings 31 and 32, and through an auxiliary bearing 33. This auxiliary bearing 33 is attached to the frame 15 by bolts 34 that have their heads in undercut grooves 35 in the surface of the frame. This connection makes the bearing 33 adjustable lengthwise along the frame.

At the left-hand end of the cam shaft 29, there is another bevel gear 28 secured to the cam shaft and meshing with a bevel gear 36 on another cam shaft 37 which extends from the front to the rear of the machine, parallel to the drive shaft 20 and the first cam shaft 23.

Referring to Figure 2, there is another cam shaft 39, at the rear of the machine, extending parallel to the front cam shaft 29. This cam shaft 39 is driven from the first cam shaft 23 through bevel gears 27 and 28. The left-hand end of the cam shaft 39 is connected with the left-hand cam shaft 36 through bevel gears 28 and 36.

The machine operates on a metal work strip 41. This strip material is fed into the machine with a step-by-step movement which is synchronized with the operation of the die and tool slides. In the preferred construction, the feeder advances the strip in steps which are as long as the length of strip required to make the walls of a single box.

Any suitable, conventional strip feed mechanism can be used for advancing the strip 41 with a step-by-step movement. The strip feed mechanism is shown diagrammatically as a block 42 that reciprocates along guide rails 43. A grip dog 44 jams the strip 41 against a face of the block 42 during the feed stroke (movement toward the right in Figure 2) but the grip dog releases its grip and permits the block 42 to make its return stroke without moving the strip 41 back.

The reciprocating movement of the block 42 is imparted to the block by a rod 45 connected to a strap 46 that surrounds an eccentric 47 secured to the shaft 37. The strap 46 and eccentric 47 are merely representative of follower and cam mechanism for operating the strip feed mechanism in timed relation to the other parts of the machine.

The machine has three dieheads, indicated generally by the reference characters 51, 52 and 53. These dieheads are operated by cams on the front cam shaft 29. There is a separate working cam 55, on the cam shaft 29, for moving the die in each diehead, on its working stroke; and there are two retracting cams 56, on either side of each working cam 55, for pulling the die back after each operation. A more detailed operation of the dieheads 51, 52 and 53, will be given in connection with the explanation of Figure 9.

The machine has a strip cutter indicated generally by the reference character 60. This strip cutter is operated by a working cam 61 and a retracting cam 62 secured to the cam shaft 29. The specific construction of the strip cutter 60 will be described in connection with Figures 10 and 11, and it is sufficient for the present, to understand that the strip cutter operates once, for each revolution of the front cam shaft 29, to cut the end from the strip each time that the strip is advanced into position for forming its end portion around a tool post 65 at a forming station of the machine.

There are four tool slides that move tools toward and from the post 65 for bending the strip around the post to position the sides of the box with respect to one another. The first tool slide, indicated by the reference character 68, is operated by a working cam 70 and a retracting cam 71 secured to the front cam shaft 29. The second tool, which operates to form the box blank, is operated by a slide 74 which extends throughout most of the length of the machine to a location adjacent to the left-hand cam shaft 37 in Fig. 2. There is a working cam 75 and a retracting cam 76 secured to the cam shaft 36 for operating the tool slide 74.

The third tool that operates in the forming of the box blank, around the tool post 65, is carried by a tool slide 78 operated by a working cam 80 and a retracting cam 81 secured to the rear cam shaft 39. A fourth tool slide 84, is operated by a working cam 85 and a retracting cam 86 secured to the first cam shaft 23.

There is another cam 90 on the first cam shaft 23 for operating a stripper which removes the formed box blank from the tool post 65. The stripper mechanism is operated by a lever 92, and its specific construction will be described in connection with the specific construction of other parts of the machine.

The operation of the dieheads 51, 52 and 53, on the work strip 41, is shown in Figures 5a, 5b, 6a and 6b. A fixed die element 100 is secured to a frame portion 101 of the diehead 51. There are punches 103 carried by the fixed die element 100 in position to displace knockouts at all locations where knockouts are required in the walls of the finished box. A movable die element 105 has recesses therein for receiving the punches 103, and has spring pads 107 for maintaining a pressure against the knockouts, on the side opposite the punches 103.

Figure 7a shows the positions of the knockouts 110; and Figure 8a shows the way in which the knockouts 110 are partially displaced from the strip 41 after the strip 41 has been subjected to the action of the die elements 101 and 105 of the first diehead 51.

The second diehead 52 has punches 115 which form notches 116 (Figure 7a), and has other punches 119 (Figure 5a), for shearing off all of one edge of the strip 41 except the tabs 121. Other punches 123 (Figure 5a) makes holes 124 (Figure 7a) in the tabs 121.

The die elements of the diehead 52 include also a pad 127 (Figure 6a) which co-operates with a flat face 128 on the fixed die element to thrust all of the knockouts 110 (Figure 7a) back into the plane of the strip 41. The pad 127 is loaded by compression springs 129, and its extent of movement by the springs 129 is limited by bolts 130.

In the third diehead 53 there are punches 131 carried by a movable die element 133, of the diehead 53; and these punches 131 displace metal from the strip 41 to form abutments 135 (Figures 7b and 8b) for holding the bottom of the box in place. A section through these abutments is best illustrated in Figure 17. The punches 131 (Figures 5b and 6b) thrust the metal against spring pads 136 in a fixed element 137 of the diehead 53. There are other punches that co-operate with die elements 138 to punch notches 139 (Figure 7b) in the edge of the strip 41 on both sides of each of the the tabs 121.

Figures 3 and 9 show the operating mechanism for the diehead 51. It will be understood that the operating mechanisms for the other dieheads 52 and 53 are similar. The movable element of the diehead is attached to a slide 140 which moves in a dove-tail groove 141 between gibs 142 on the main frame of the machine. The slide 140 is operated by a pitman 144, which is adjustable in length, connected to a rocker arm 146.

The rocker arm 146 is supported by a pivot shaft 148, from the main frame of the machine; and this rocker arm 146 has a center cam follower 150 in position to bear against the face of the working cam 55. Other cam followers 152 extend from opposite sides of the rocker arm 146 into grooves in the retracting cams 156. The action of the cam followers 150 and 152 is similar to that of a single cam follower in a groove cam, but the construction illustrated obtains a direct thrust from the working cam 55, in the plane with the pitman 144, while the retracting cam followers 152 obtain a balanced pull on the rocker arm. It is not necessary to have a force for retracting the pitman in the plane of the pitman since the retracting force is comparatively small compared with the force required to operate the moveable die element on its working stroke.

Figure 10 shows the cutter 60 for severing the strip. The cutter includes a guide 160 secured to the main frame of the machine. A slide 162 moves back and forth in the guide 160 and carries a shearing blade 164 which thrusts the strip 41 against a complementary shearing blade 166, on the other side of the strip, to sever the strip each time the slide 162 advances.

There is a link 168 connected at one end to the front of the slide 162. The other end of the link 168 extends between two levers 170, and it is connected with the levers 170 by a pin 172 which extends through the levers 170 and through the link 168, with spacing washers, as shown in Figure 11. The levers 170 are connected, at their upper ends, to a bracket 173 secured to the top of the guide 160. This connection between the levers 170 and the bracket 173 consists of a fulcrumpivot shaft 175.

At the lower end of the levers 170, there is a shaft 178 which carries two cam followers 181 and 182. The cam follower 181 is located between the levers 170 in position to bear against the face of the working cam 61. The other cam follower 182 is located beyond the right-hand lever 170, and extends into a recess 183 in the retracting cam 62 in position to bear against a cam face 184 of the retracting cam 62.

The operating mechanism for the forming tools is best shown in Figure 2. The slide 78, which carries the third-forming tool, is supported by a bearing surface on the main frame of the machine; and this slide has sloping side bearings which run in a guideway provided by gibs 188 connected to the frame of the machine and providing a dove-tail guideway. At its rearward end, the slide 78 has a yoke 190. This yoke is connected to the slide 78 by a pivot connection 192 (Figure 3, and the yoke 190 carries two cam followers 194 and 195 (Figure 2). The cam follower 194 is operated by the working cam 80 and is in alinement with the direction of movement of the slide 78. The other cam follower 195 extends into a groove in the retracting cam 81.

Referring again to Figure 3, the yoke 190 can be adjusted with respect to the slide 78 to control the position at which the slide stops at the end of its stroke. This adjustment is obtained by a screw 197 which can be turned one way or the other to move the cam followers closer to or further from the slide 78.

The other forming tool slides 68, 74, and 84 are operated by similar cam followers and motion-transmitting connections, in some instances of different length, from the cam groups 70—71, 75—76 and 85—86.

The successive steps by which the blank is bent around the tool post 65 is shown in Figures 14-16. When the blank is cut from the end of the work strip 41, the end face of the severed blank is in contact with the abutment 136, as shown in dot and dash lines in Fig. 14. In this position, the panel of the blank which is to form the front side of the box is adjacent to the front face of the tool post. A first forming tool 201 (Figs. 13 and 14) carried by the slide 68, moves from the dotted line position to the full line position, and in doing so bends the strip into the position shown by full lines in Figure 14.

A second forming tool 204 (Figs. 13 and 15) is carried by the slide 74. This forming tool 204 is connected to its operating mechanism by a pivot connection 206, and in this respect differs from the other forming tools. The purpose of this pivot connection 206 is to permit the forming tool 204 to swing back, away from the tool post 65, so that there is clearance for the strip to swing past the tool 204 as the blank is bent by the first forming tool from the dot and dash line position to the position shown in full lines in Figure 14. The end of the strip swings through the arc indicated by the line 208 (Fig. 13) so that it clears the forming tool 204 when the forming tool is in its retracted position indicated by dotted lines.

The forming tool 204 has a stud 210 on which cam follower 212 is carried. This cam follower 212 runs in a cam groove 213 in the lower face of a plate 214 which is connected to a fixed part of the frame of the machine immediately above the forming tool 204. When the slide 74 advances toward the tool post 65, the cam follower 212 advances along the groove 213 and causes the forming tool 204 to swing from the dotted line position to the full line position. This movement of the tool 204 bends the box blank to the position shown in Figure 15.

A third forming tool 216 (Figure 13) carried by the slide 78, is then advanced toward the tool post 65 to bend the remaining short end of the box blank around the right hand rearward corner of the tool post. The final forming step is performed by a fourth forming tool 220, carried by the slide 84. This forming tool 220 presses the dove-tail end portions of the box blank into engagement with one another and thus completes the forming of the box blank around the tool post 65.

It will be understood that the cams which operate the strip feed, the die heads, and the forming tools are adjusted to actuate their parts successively and in desired timed relation with one another; and this relation is illustrated in Figure 18.

After the box blank has been formed around the tool post, it is removed from the post by a stripper 225, shown in Fig. 1. The stripper moves up and down in a stripper guide 227 carried by the frame of the machine, and the lower edge of the stripper contacts with the top faces of the various sides of the formed blank to push the blank downwardly along the tool post and off the bottom of the tool post where the blank is discharged from the machine.

The stripper 225 is operated by a rocker arm 230 supported on a fulcrum pivot 231 which can be placed in any of several openings 233 in a bracket 235 connected to the rigid frame of the machine. By inserting the pivot 231 in different openings 233, the stroke of the stripper can be changed.

The rocker arm 230 is connected to the stripper 225 by a sliding block 238 which runs in a guide bearing 239 at the top of the stripper. The block 238 is attached to the rocker arm 230 by trunnions 240 extending into a forked end of the rocker arm 230. The rocker arm 230 is operated by a cam follower 244 (Figure 2) which extends into a groove 245 in the face of the cam 90.

The power driving connections for the machine are best shown in Figure 4. An electric motor drives the main shaft 20 through a silent chain 248 which runs on a sprocket 250 secured to a sleeve 251 which surrounds the main drive shaft 20. This sleeve is supported by bearings 252 and 253, and there is a fly wheel 255 secured to the sleeve 251. The fly wheel is shown extending into a pit 256 in the foundation on which the machine rests. A clutch 258 connects the sprocket 250 with the drive shaft 20. When this clutch is disengaged, the sleeve 251 and fly wheel 255 rotate as a unit, and when the clutch is disengaged they rotate without supplying any power to the drive shaft 20 of the multislide machine.

The clutch 258 is operated, to engage or disengage, by a throwout collar 260. This throwout collar 260 is operated by a yoke 262 connected by a pivot 263 to a bracket 264 on the base of the machine. The yoke 262 has a lever arm 266 which extends below the pivot 263, and which is connected with an operating rod 268 by a pivot 269.

The rod 268 slides longitudinally in bearings 271 and 272 fixed to the frame of the machine. A motor, preferably a cylinder and piston motor 275, is connected to the rod 268 for imparting longitudinal movement to the rod 268. The clutch 258 is thus engaged and disengaged by operation of the motor 275. In the preferred construction, this motor 275 is operated by compressed air so as to obtain rapid and reliable operation of the clutch.

There is a friction brake 280 connected to the frame of the machine and to the shaft 20. When this brake is applied, the drive shaft 20 is brought to a quick stop so that movement of all parts of the machine is arrested. The brake 280 is operated by the same throwout collar 260 which operates the clutch 258. The brake is connected to the throwout collar 260 in such a way that the movement of the throwout collar, in the direction that engages the clutch 258, releases the brake 280. Conversely, movement of the throwout collar 260, in the direction that disengages the clutch 258, applies the brake 280.

When the throwout collar 260 is in an intermediate, neutral position, the clutch is disengaged but the brake is not yet applied. This neutral position is used when adjusting the machine and when threading the work strip through the machine at the beginning of a new run. For the purpose of moving the machine slowly and the parts for limited, controlled distances, the drive shaft 20 is provided with a hand wheel 282 at the front end of the machine.

Figure 19 shows an automatic latch mechanism for holding the rod 268 in different positions. There is a tapered collar 285 with a hub 286 attached to the rod 268 by a pin 287. This tapered collar 285 moves past a latch 290 which slides in a bearing block 291. There is a flange 293 on the latch element 290. A spring 295 is compressed between the flange 293 and the end wall of a housing 296 in which the spring 295 is enclosed.

This spring 295 urges the latch element 290 toward the rod 268, but the forward movement of the latch element 290 is limited by the abutting of the flange 293 against the bearing block 291. When in its forward position, shown in full lines in Figure 17, the latch 290 is in the path of the tapered collar 285. The left-hand face of the tapered collar 285 is flat and strikes against a flat face on the right-hand side of the latch element 290 to prevent longitudinal movement of the rod 268. This holds the rod 268 in the position corresponding to the neutral position of the yoke 262. The collar 285 can be held against the latch element 290 by maintaining some air pressure in the motor 275.

When the clutch is engaged, the tapered collar 285 occupies the dot and dash line position indicated by the legend "engagement," and when the brake is applied the tapered collar 285 occupies the dot and dash line position indicated by the legend "brake."

Because of the tapered face of the collar 285 and a corresponding slope on the end face of the latch element 290, the collar 285 can move past the latch element 290 when the rod 268 is moving longitudinally toward the right in Figure 17. In order to permit the collar 285 to move past the latch element 290, when the rod 268 is moving toward the left, the latch element 290 is pulled back, against the tension of the spring 295, out of the path of the collar 285. The latch element 290 has a handle portion 298 by which it can be pulled back against the tension of the spring.

From this description it will be apparent that the motor 275 can always operate the rod 268 to disengage the clutch and apply the brake, but the clutch cannot be engaged to again start the operation of the machine, without first operating the handle 298 to permit the collar 285 to pass the latch element 290.

The motor 275 is operated automatically, to stop the machine, whenever there is a failure in the proper feeding of the work strip to the machine. Control switches can be located at various parts of the machine for detecting failure in the proper feed of the work strip, and such detectors are commonly used on other types of automatic machines.

With the machine of this invention, a switch 300 (Figure 2) is located along the path of travel of the work strip 41 between the feed mechanism and the rest of the machine. This switch 300 is close to the strip at a region where the strip passes along a rigid guide on the side of the strip opposite the switch. If the improper functioning of the machine causes the strip 41 to buckle when the feed mechanism is operated, the transverse movement of the strip 41 causes the strip to strike the switch 300 and operate the switch. This operation of the switch causes a control circuit to energize an electrically-operated valve 302 to supply compressed air to the motor which disengages the clutch and applies the brake to stop the machine (Fig. 4).

After the formed box blank comes from the machine, the flanges are still in their original alinement with the sides of the blank to which they are connected, and so are the tabs 121. The formed blank is then placed in a socket 305 (Figure 17) of a die 306 under a die head 308. The formed blank is placed in the socket 305 with the blank upside down. A bottom plate 310 is placed within the sides and allowed to drop into contact with the tabs 135. When the die head 308 is brought down, it bends the tabs 121 and the flanges inwardly, and the flanges extend over the bottom plate to secure it in assembled position. This is the final step in the forming of the box. After this final forming step, the connection between the ends of the side strip, that is, the dovetail sockets and projections shown in Figure 12, may be spot welded for greater strength, and the openings 124 may be threaded.

The preferred construction has been illustrated and described, but changes and modifications can be made and some features of the invention can be used in different combinations without departing from the invention as defined in the claims.

I claim as my invention:

1. Apparatus for making generally square electric outlet boxes, each side of which has a length substantially equal to that of each other side, the walls having knockouts therein, lugs at the top for holding a cover, abutments displaced from the walls near the lower ends of the walls and flanges for clamping a bottom of the box against the abutments, said apparatus comprising a main frame, operating stations on the frame and spaced from one another and through which a work strip passes, one station at the front end of the frame including feeding mechanism that advances a supply strip from a reel in steps as long as four side lengths of the box, continuously-running power-operated driving means for the feeding mechanism including an intermittent actuator for producing an interval of time between feeding steps, die means beyond the feeding station for cutting and punching the strip and through which the strip passes while still connected to the strip on the reel, the length of the die means being at least four side lengths, mechanism operated from said driving means and operable to actuate the die means during the period between successive feeding steps of the feeding mechanism, a forming station including a post spaced from the rearward end of the die means by approximately six side lengths to provide a tool space and adjacent to which the end of the strip is advanced by each feeding step, a cutter located between the rearward end of the die means and the forming station and substantially four side lengths from said rearward end of the die means, mechanism that operates the cutter from said driving means at the end of each feed stroke to sever a box blank from the strip, forming tools at the forming station including one tool located in said tool space, and mechanism operated by said driving means to move different forming tools into contact successively with the severed piece of the strip to wrap it around the post and bring the opposite ends together, said mechanism including a motion transmitting connection extending from the tool in said tool space lengthwise of the machine to the driving means for the feeding mechanism at the front end of the frame.

2. The apparatus for making electric outlet boxes as described in claim 1 and in which the cutter between the last die head and the forming station includes means for making a dovetail cut, and the forming tools bring the dovetail edges together again around the post to lock the sides of the blank at a predetermined perimeter around the post, and there are means for stripping successive box blanks from the post.

3. The apparatus for making electric outlet boxes as described in claim 1 and in which there are separate cams for operating the feeding mechanism, the die means, the cutter mechanism and the forming tools, and motion-transmitting connections by which all of the cams are driven from said continuously-running power-operated driving means in timed relation with one another, the continuously-running driving means including a flywheel, and the motion-transmitting connections including a clutch by which all of the cams can be disconnected from the flywheel.

4. The apparatus for making electric outlet boxes as described in claim 3 and in which there is a brake connected with the driven side of the clutch for stopping all of the cams quickly upon disengagement of the clutch.

5. The apparatus for making electric outlet boxes as described in claim 3 and in which there is automatic control mechanism which disengages the clutch and applies the brake, the automatic control mechanism having means responsive to irregularity of the strip feed including a device operated by buckling of the strip to operate the control mechanism to disengage the clutch and apply the brake.

References Cited in the file of this patent

UNITED STATES PATENTS

| | | |
|---|---|---|
| 321,882 | Kind | July 7, 1885 |
| 1,925,034 | Fitzgerald | Aug. 29, 1933 |
| 1,988,930 | Winne | Jan. 22, 1935 |
| 2,074,873 | Titus | Mar. 23, 1937 |
| 2,092,255 | Keller | Sept. 7, 1937 |
| 2,183,159 | Chesley | Dec. 12, 1939 |
| 2,189,609 | Lessman | Feb. 6, 1940 |
| 2,301,236 | Yoder | Nov. 10, 1942 |
| 2,544,266 | Kennedy | Mar. 6, 1951 |
| 2,618,840 | Danly | Nov. 25, 1952 |

FOREIGN PATENTS

| | | |
|---|---|---|
| 15,265 | Great Britain | July 27, 1901 |